(12) United States Patent
Riddiford

(10) Patent No.: US 6,587,675 B1
(45) Date of Patent: Jul. 1, 2003

(54) HAND-HELD COMPUTER AND COMMUNICATIONS APPARATUS

(75) Inventor: Martin P. Riddiford, London (GB)

(73) Assignee: Therefore Limited, London (GB)

( * ) Notice: Subject to any disclaimer, the term of this patent is extended or adjusted under 35 U.S.C. 154(b) by 0 days.

(21) Appl. No.: 09/297,260

(22) PCT Filed: Oct. 28, 1997

(86) PCT No.: PCT/GB97/02950
§ 371 (c)(1),
(2), (4) Date: Sep. 8, 1999

(87) PCT Pub. No.: WO98/19226
PCT Pub. Date: May 7, 1998

(30) Foreign Application Priority Data

Oct. 28, 1996 (GB) ............................................. 9622349

(51) Int. Cl.[7] ................................................ H04B 1/38
(52) U.S. Cl. .......................... 455/90; 455/557; 455/566
(58) Field of Search .......................... 455/90, 575, 566, 455/556, 557; 379/433, 428; 361/680

(56) References Cited

U.S. PATENT DOCUMENTS

| | | | | |
|---|---|---|---|---|
| 4,517,660 A | * | 5/1985 | Fushimoto et al. | 200/5 A |
| 5,189,632 A | * | 2/1993 | Paajanen et al. | 455/556 |
| 5,219,067 A | * | 6/1993 | Lima et al. | 200/302.2 |
| 5,267,127 A | * | 11/1993 | Pollitt | 341/20 |
| 5,410,333 A | * | 4/1995 | Conway | 341/20 |
| 5,584,054 A | * | 12/1996 | Tyneski et al. | 455/566 |
| 5,712,760 A | * | 1/1998 | Coulon et al. | 361/680 |
| 5,734,513 A | * | 3/1998 | Wang et al. | 345/32 |
| 5,777,281 A | * | 7/1998 | Riddiford | 200/5 A |
| 5,797,089 A | * | 8/1998 | Nguyen | 455/403 |
| 5,818,924 A | * | 10/1998 | King et al. | 379/433.04 |
| 5,941,648 A | * | 8/1999 | Robinson et al. | 400/82 |
| 6,088,220 A | * | 7/2000 | Katz | 361/680 |
| 6,256,017 B1 | * | 7/2001 | Bullister | 345/168 |

FOREIGN PATENT DOCUMENTS

GB        2 151 379 A    *  7/1985

* cited by examiner

*Primary Examiner*—Charles N. Appiah
(74) *Attorney, Agent, or Firm*—Breiner & Breiner, L.L.C.

(57) ABSTRACT

Combined computer and communications apparatus is described which is constructed with a two-part casing, the parts (1, 2) being hinged together. When folded together, the entire unit can act like a mobile phone (FIG. 1) and when unfolded (FIG. 2) a keyboard (5) is exposed enabling it to act as a palmtop computer. In accordance with the invention, the keyboard (5) is folded about a line running substantially perpendicular to the direction of the rows of keys. One casing portion (1) may have a window (4) through which a screen (3) mounted on the other casing portion (2) may be viewed when the unit is folded.

9 Claims, 6 Drawing Sheets

HAND-HELD COMPUTER AND COMMUNICATIONS APPARATUS

FIELD OF INVENTION

This invention relates to hand-held computer and communications apparatus.

BACKGROUND OF INVENTION

In recent years, there has been a revolution both within computing and telecommunications which has placed great emphasis on making computing and communications devices more powerful, smaller, and lighter. This has applied in the areas of both computing and communications technology.

In the former, personal computers have shrunk first to the portable computer, then the laptop and, most recently, the palmtop. In the case of both laptop and palmtop the tendency has been to structure the device as a hinged foldable unit, with a screen-containing flap rotating about a line parallel with rows of keys in a standard keyboard. This arrangement has the advantage of protecting the generally sensitive screen when the device is out of use. It also has the advantage of preserving the efficient data entry achievable using a standard "typewriter" form of keyboard. Millions of people are familiar with these and comfortable when using one, even if inefficiently by pecking with two fingers rather than using all the fingers and both thumbs. Attempts to dispense with the standard well-known typewriter keyboard have attracted few adherents. The generally oblong shape of the keyboard has impelled the use in many applications of a generally oblong "landscape" format screen located above it, and this is a feature of most laptop and palmtop computer apparatus.

In the mobile telephone field, mobile telephones requiring a power pack to operate them have been replaced by simple hand-held units with a re-chargeable power supply, but giving adequate performance to ensure their widespread adoption. The hand-held units generally resemble a stubby handset, and are normally used by holding the whole unit by the side of the head, with one end adjacent one ear, an aerial projecting from the top, and the lower end of the unit, containing a microphone, near the mouth of the user. As the power of "microchips" has increased, suggestions have been made to enhance the basic mobile telephone unit with further functions. WO93/18591 GB-A-2291560 and GB-A-2297662 show three approaches to providing a mobile phone with a keyboard or touchscreen input. None of these constructions is convenient to use as the stubby handset overall shape is inappropriate, nor is the docking telephone handset incorporating a keyboard and adjacent single line display disclosed in U.S. Pat. No. 4,661,659.

EP-A-0534478 discloses a combined mobile telephone unit and electronic notebook. A telephone keypad is mounted one side of a flap which can be lifted away from the main body of the unit to reveal function keys on the main body and additional ones on the back of the flap. Together these constitute a keyboard which may be used to enter notebook data. However, the arrangement is not convenient to use, the flap is only supported at one edge when folded out, and the screen display is small. The ease of use of a conventional palmtop is not approached.

In the area of hand-held calculators, some enhanced "calculator" constructions have been produced where the calculators have been constructed with two sections openable out like a conventional portrait format book. In several known such calculators the standard numeric and function key keypad and a relatively small display have been mounted in one half and a set of enhanced function is keys as a keypad set in the other half.

OBJECTS AND SUMMARY OF THE INVENTION

We have now found that if a folding palmtop construction. is used which folds about an axis perpendicular to the rows in the keyboard, combined communications and computer apparatus of great ease of use may be constructed.

According to one aspect of the present invention, there is provided a palmtop computer apparatus including a display screen and a landscape format keyboard, both mounted in a two-part foldable casing, wherein the hinge axis about which the parts of the casing fold is substantially perpendicular to the direction of rows of keys on the keyboard.

According to an alternative aspect, the present invention provides combined computer and communications apparatus including a casing having two portions hinged to one another and foldable from a closed folded condition to an open generally flat condition, a planar foldable keyboard and a display screen, both accessible when the casing is in the opened condition, the keys on the keyboard being arranged in rows running in a direction substantially perpendicular to the axis of hinging between the two portions of the casing.

Part of the casing may include an antenna which may be fixed or slidable between a retracted and an extended position, in both cases extending in a direction parallel to the axis of hinging.

Preferably the two portions of the casing are of substantially equal size.

The outside of one part of the casing, when closed, may be configured to enable the apparatus to be used as a mobile telephone with the appropriate actuation buttons or the like for this.

In a particularly preferred form of the apparatus in accordance with the invention, one portion of the casing contains an aperture and the other a screen, the arrangement being such that the entire screen and the main, usually Qwerty, keyboard are visible when the casing is opened, and at least part of the screen is visible through the aperture when the casing is in the folded condition.

The alpha-numeric keyboard, conventionally of standard qwerty, etc. arrangement, preferably takes the form of a continuous rubber resilient pad keyboard of known type which, by appropriate design, may be made to fold when the unit itself is folded up.

Switch means may be associated with the portions of the casing to enable the apparatus to know whether it is folded or flat, and to operate accordingly under software control, e.g. to prevent operation of the device as a computer when the casing is folded shut and optionally preventing operation of the device as a telephone when the casing is opened.

In a particularly preferred form of the invention, the keyboard for computer input and the actuation pads for the mobile telephone are formed as a single unit which, when inserted in the casing, extends across the lower portion, conveniently usually the lower third to half, of the open casing with the portion constituting the keypad for the telephone folded around to underlie the "front" of the casing when the unit is closed.

Apparatus according to the present invention has the further advantage of being well suited to use in conjunction with a so-called docking station. Part of the casing may have a connector set in it which may mate with a suitable connector in the docking station to enable a full screen display (conventional video display unit) to be used, e.g. forming part of a standard desktop computer. Data may be exchanged between palmtop and desktop computer in known fashion using such a docking station, or the docking station may effectively be used to convert the palmtop to a desktop machine, which may have other peripherals such as printer, scanner, faxcard etc. connected thereto.

BRIEF DESCRIPTION OF DRAWINGS

The invention is illustrated, by way of example, by apparatus constructed in accordance with the invention shown schematically in the accompanying drawings. In these drawings.

DESCRIPTION OF PRESENTLY PREFERRED EMBODIMENTS

Figure 1:
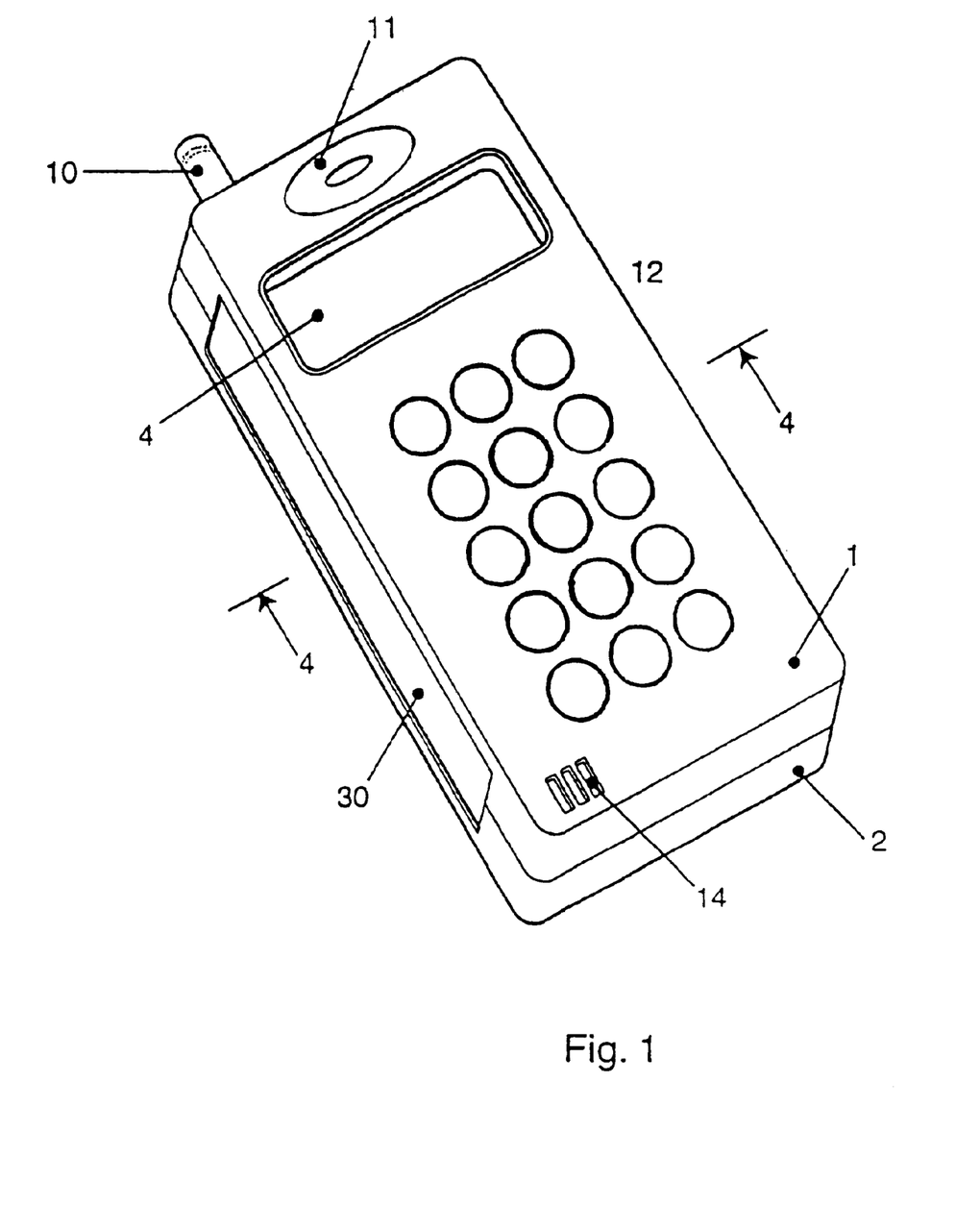
FIG. 1 is a perspective view of apparatus in accordance with the invention folded up and in the "mobile telephone" use position.
Figure 2:
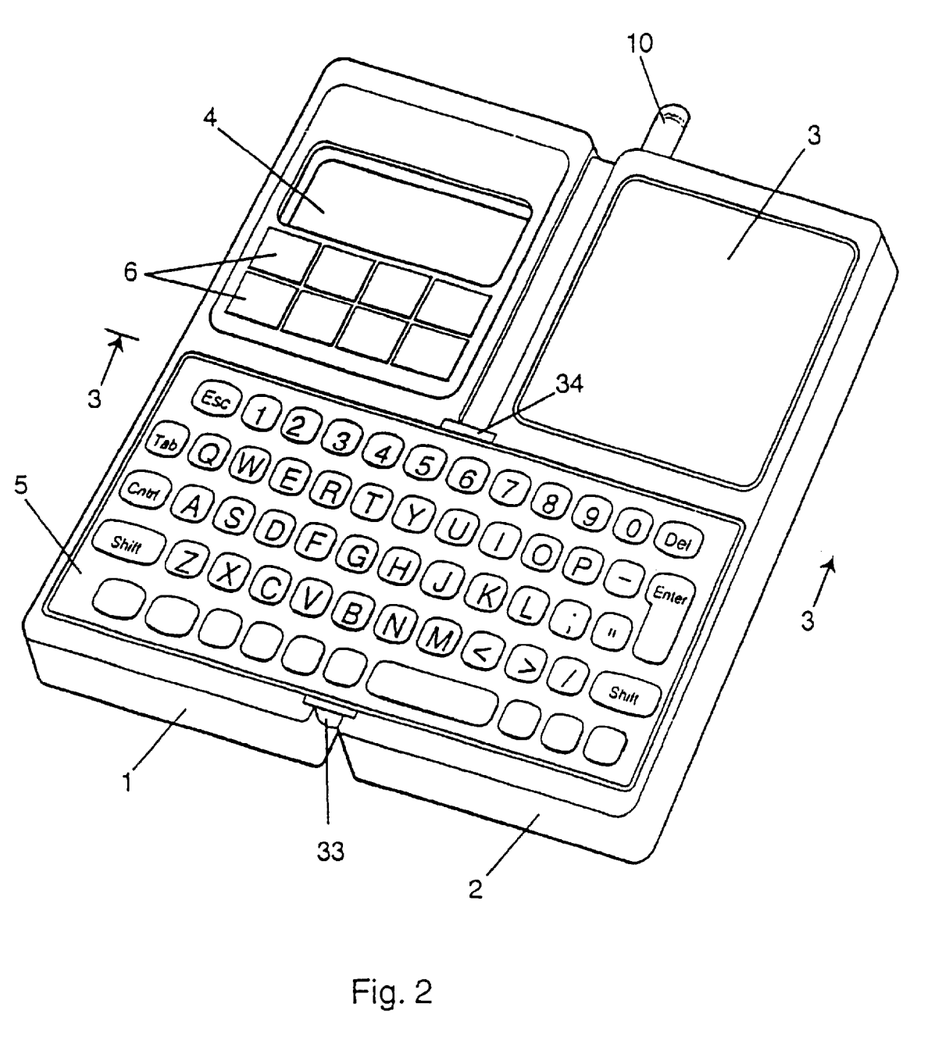
FIG. 2 is a perspective view of the apparatus of FIG. 1 unfolded to act as a palm top computer.
Figure 3:
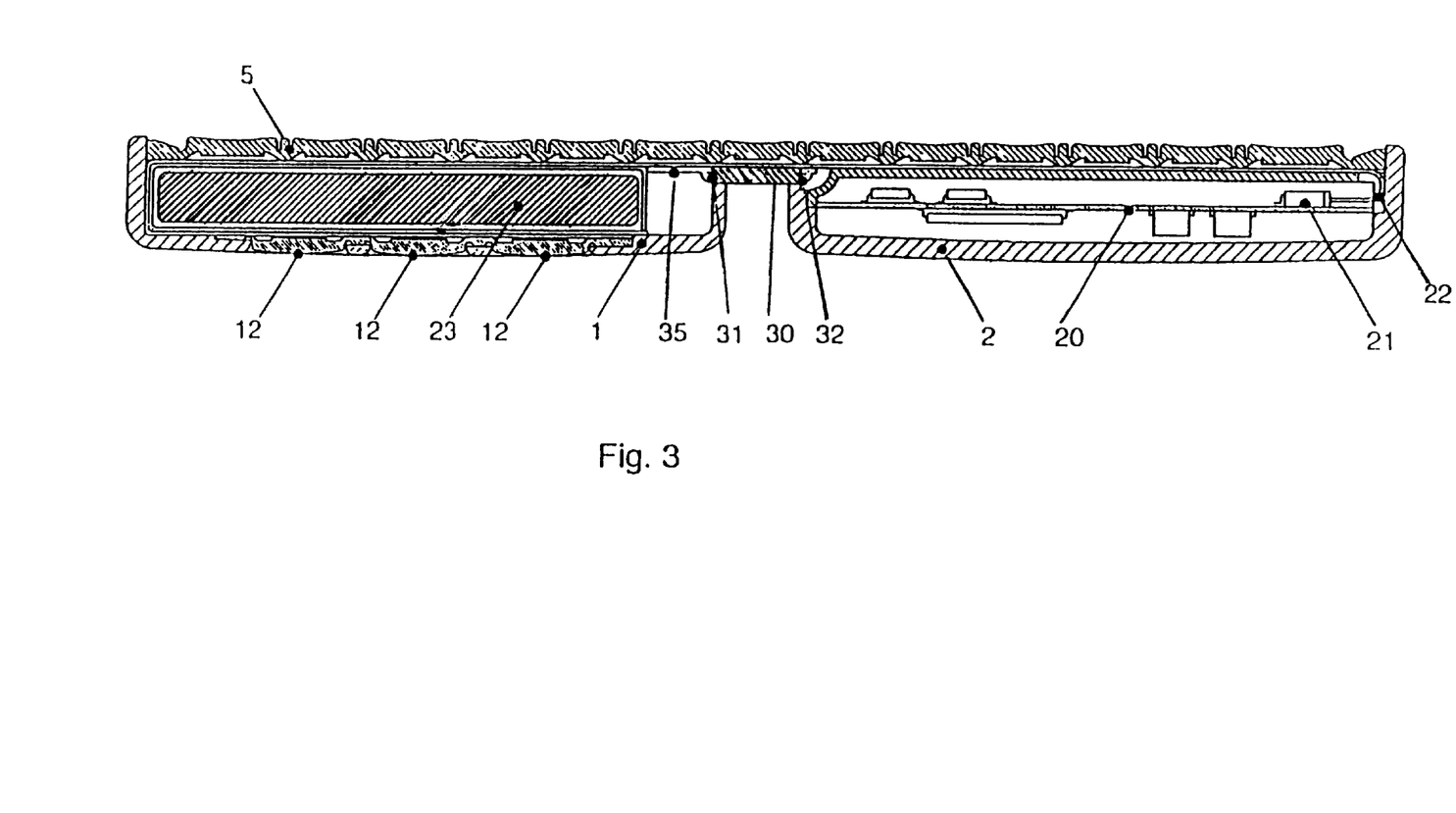
FIG. 3 is a diagrammatic section along the lines 3—3 in FIG. 2.
Figure 4:
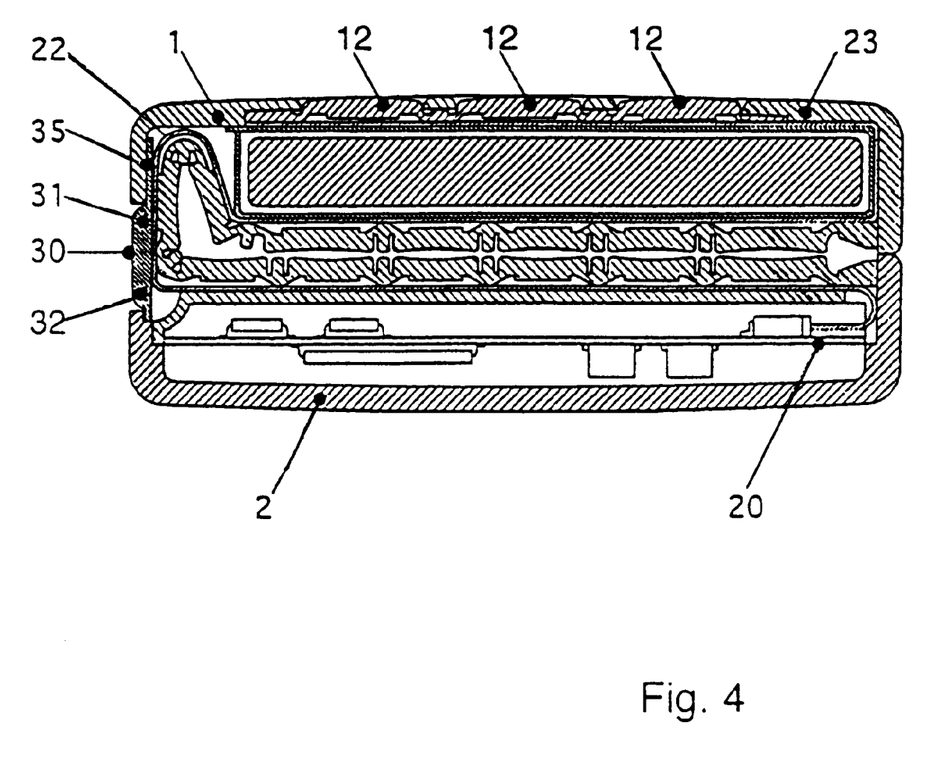
FIG. 4 is a diagrammatic section through the lines 4—4 in FIG. 1.

Referring first to the apparatus shown in FIGS. 1 to 4, a combined palmtop computer and mobile telephone unit is shown with the unit folded in FIGS. 1 and 4 and opened out for use as a palmtop in FIGS. 2 and 3. It has a casing having two sections 1 and 2 which can be thought of as the left hand and right hand portions of an opened book. Casing portions 1 and 2 are hinged together as described in more detail below. Mounted in casing portion 2 are a display screen 3, the right hand portion of a flexible keyboard S and an antenna 10 for use when the item is used as a mobile telephone. Mounted in casing portion 1 are the left hand portion of keyboard 5, a set of function buttons 6 for use when the apparatus is being used as a palmtop computer, an audio transducer acting as the sound output for the telephone via an aperture 11, a numeric and function button keypad with keys 12, again for use when the apparatus is being used as a mobile telephone and a microphone located behind a small set of slots 14. Casing portion 1 also has a window 4 through which a part of screen 3 can be seen when the device is as shown in FIGS. 1 and 4, which part is used to display information relevant to telephone use, for example the number dialled, a menu of stored numbers, battery power-status or which mobile telephone networks are available.

FIGS. 3 and 4 show schematically the internal construction of the apparatus. Located in casing portion 1 is a battery pack 23 to power the apparatus. Located in casing portion 2 is a circuit board 20 on which a few components are diagrammatically indicated. Near the right hand end of board 20 as shown in FIGS. 3 and 4 is a socket 21 in which is engaged the end of a flexible membrane 22 bearing conductive tracks and areas and which constitutes part of the keyboard 5. In known fashion, overlying membrane 22 is a rubbery moulded array of keys which each has a conductive surface facing the membrane 22 but spaced slightly away from the membrane when no key is depressed. On depressing a key, is underside contacts the membrane surface and connects two adjacent conductive areas, which connection is detected by the standard electronics on board 20 and interpreted by the computer "chips" it carries. Membrane 22 extends under all of the keys of keyboard 5 and then turns down and back (as seen at the left hand end of FIG. 3) to lie below keys 12.

Casing sections 1 and 2 are hinged together via an arrangement of pivotally mounted plates of which two, denoted 33 and 34, are visible in FIG. 2 and a cover plate 30. Each casing section can pivot relative to plate 30 about axes 31 and 32. Internally mounted springs (not shown) may operate in known fashion to urge the casing sections to lie preferentially in the opened out flat position as shown in FIGS. 2 and 3 or the folded position shown in FIGS. 1 and 4. To give improved support to keyboard 5 when the apparatus is being used as a palmtop, plate 30 has a flange 35 extending leftwards as shown in FIG. 3.

When the apparatus is to be used as a palmtop, as shown in FIGS. 2 and 3, the entire screen 3 is visible and the keyboard 5, which as shown is of standard querty arrangement, can be used. It is of particular convenience that the palmtop can be used held in the user's hands or on a surface such as a desktop or table. In the first case, the user's left and right hand fingers support casing sections 1 and 2 respectively and the thumbs are used to depress the keys on keyboard 5, with the left thumb used to operate function buttons 6. In the second, the keyboard can simply be used with as many fingers and thumbs as the user habitually uses when operating a standard alphanumeric keyboard.

When it is desired to use the device as a telephone, casing portions 1 and 2 are folded together and the apparatus assumes the configuration shown in FIGS. 1 and 4. As can be seen, this resembles a standard mobile telephone unit. Part of the screen can be seen through the window 4 and the various function buttons and numeric keypad 12 are accessible for mobile telephone operation.

Figure 5:
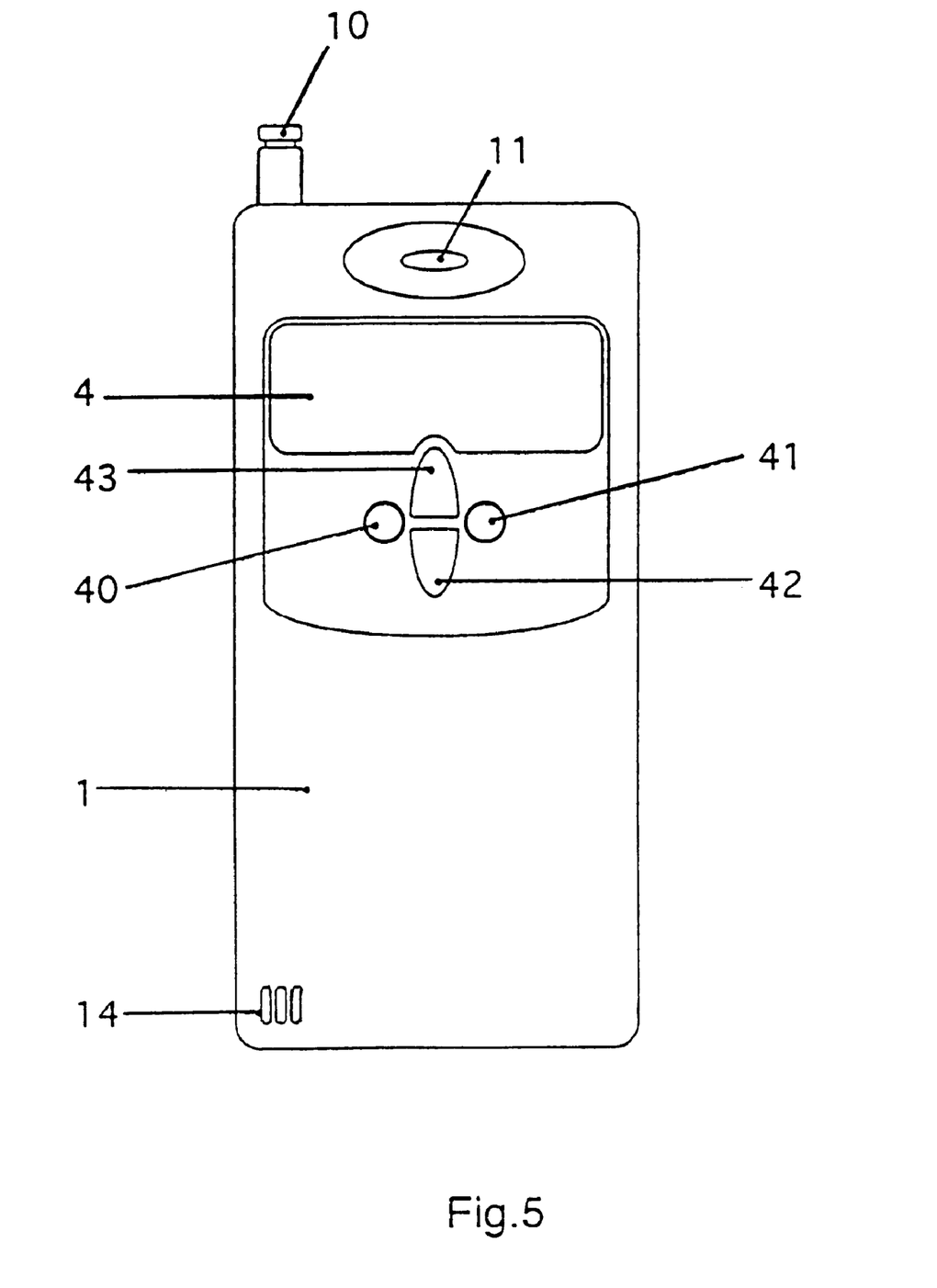
FIG. 5 is a front view of an alternative construction in folded form for use as a mobile telephone.
Figure 6:
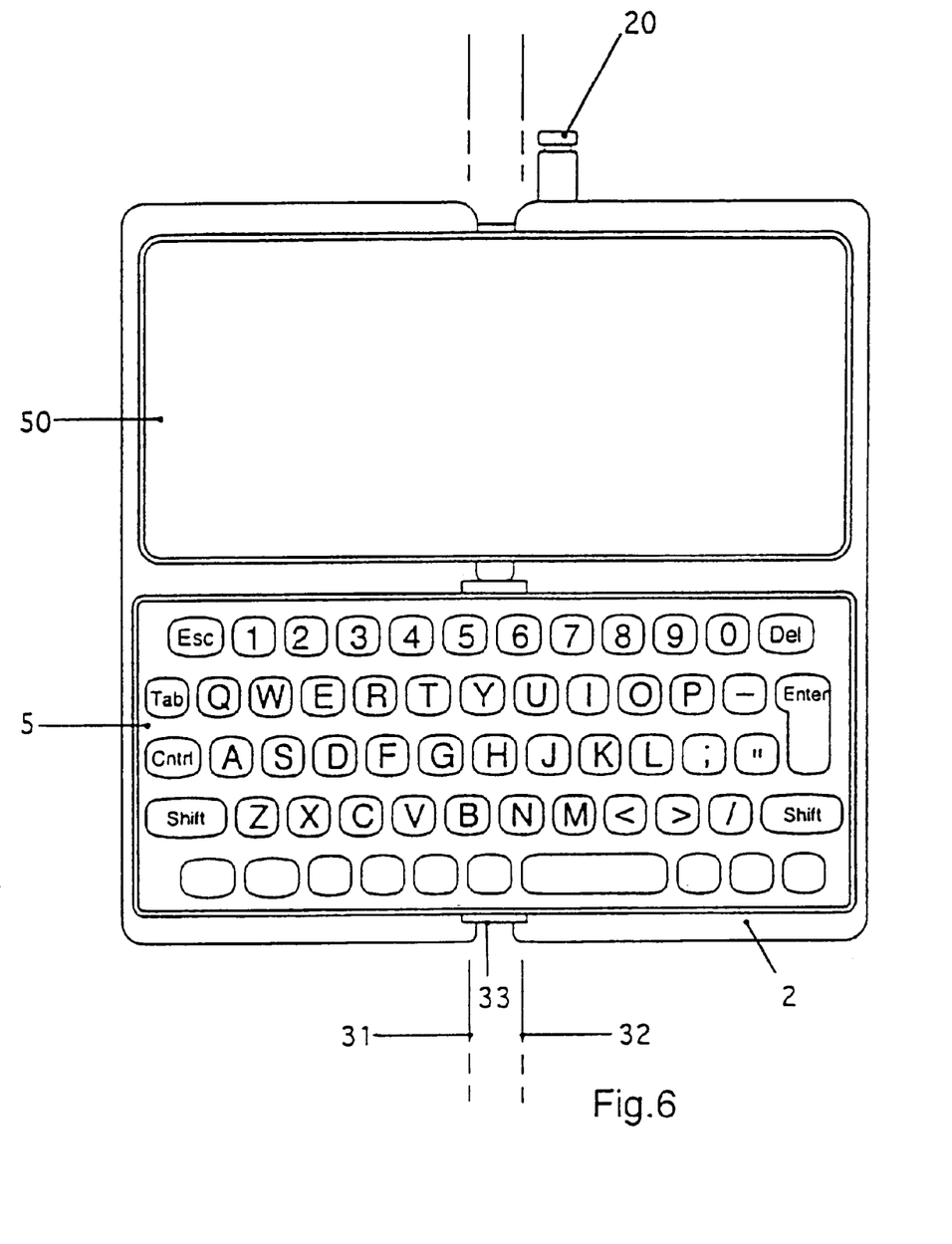
FIG. 6 is a view of a further alternative construction in unfolded condition.

FIGS. 5 and 6 show variations of the detailed arrangements shown in FIGS. 1 to 4. In the variant shown in FIG. 5, the number of operation buttons has been reduced to four, viz SEND and END buttons 40 and 41 and scroll down and up buttons 42 and 43. In FIG. 6, the display screen for viewing when the apparatus is being used as a palmtop computer is the full width of keyboard 5, and is formed by using a flexible liquid crystal display screen of appropriate construction. Clearly in the case of the apparatus shown in FIG. 6, the window 4 going right through casing portion 1 is omitted. Instead, a small display screen dedicated to mobile communications use, for status display or as a pager display, can be easily mounted in casing portion 1 underlying the left hand part of screen 50.

What is claimed is:

1. A palmtop computer apparatus including a display screen and a foldable landscape format keyboard, both mounted in a two-part foldable casing, wherein the apparatus contains two hinge axes about which the parts of the casing and the keyboard fold are substantially perpendicular to the direction of rows of keys on the keyboard, and the keys of the keyboard are located on both parts of the two-part casing, wherein the two hinge axes comprise a plate, a first pivot axis and a second pivot axis, with said first pivot axis being spaced from said second pivot axis such that each section of the two-part foldable casing pivots relative to the hinge axes.

2. A combined computer and communications apparatus including a display screen and a foldable landscape format keyboard, both mounted in a two-part foldable casing, wherein the apparatus contains two hinge axes about which the parts of the casing and the keyboard fold are substantially perpendicular to the direction of rows of keys on the keyboard, and the keys of the keyboard are located on both parts of the two-part casing, wherein the two hinge axes comprise a plate, a first pivot axis and a second pivot axis, with said first pivot axis being spaced from said second pivot axis such that each section of the two-part foldable casing pivots relative to the hinge axes.

3. Apparatus according to claim 1 or 2 wherein the two portions of the casing are of substantially equal size.

4. Apparatus according to claim 1 or 2 wherein the keyboard is in the form of a continuous rubber resilient pad keyboard foldable generally about a line perpendicular to the rows of keys therein.

5. Apparatus according to claim 1 or 2 further including switch means adapted to enable the apparatus to know whether the apparatus is folded closed or opened out flat.

6. Apparatus according to claim 1 or 2 wherein the keyboard is a full Qwerty keyboard for computer input and actuation pads for mobile telephone operation are formed as a single unit with the keyboard extending across a lower half of the casing when unfolded flat, and which is folded round to underlie the front of the casing when the casing is folded closed.

7. Apparatus according to claim 1 or 2 wherein one portion of the casing contains an aperture and one portion contains a screen, such that the entire screen is visible when the casing is opened to reveal the keyboard and at least part of the screen is visible through the aperture when the casing is in folded condition.

8. Apparatus according to claim 2 wherein one portion of the casing includes an antenna slidable between a retracted and an extended position in a direction parallel to the axis of hinging.

9. Apparatus according to claim 2 further comprising on the outside of one portion of the casing when in the closed folded condition a plurality of actuation buttons enabling the apparatus to be used as a mobile telephone.

* * * * *

UNITED STATES PATENT AND TRADEMARK OFFICE
CERTIFICATE OF CORRECTION

PATENT NO.    : 6,587,675 B1
DATED         : July 1, 2003
INVENTOR(S)   : Martin P. Riddiford It is certified that error appears in the above-identified patent and that said Letters Patent is hereby corrected as shown below:

Column 2,
Line 8, "construction." should read -- construction --

Column 3,
Line 42, "keyboard S" should read -- keyboard 5 --.

Signed and Sealed this

Seventh Day of October, 2003

JAMES E. ROGAN
*Director of the United States Patent and Trademark Office*